US011201829B2

(12) United States Patent
Deval et al.

(10) Patent No.: US 11,201,829 B2
(45) Date of Patent: Dec. 14, 2021

(54) TECHNOLOGIES FOR PACING NETWORK PACKET TRANSMISSIONS

(71) Applicant: Intel Corporation, Santa Clara, CA (US)

(72) Inventors: Manasi Deval, Portland, OR (US); Gregory J. Bowers, Hillsboro, OR (US); Ryan E. Hall, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 16/415,023

(22) Filed: May 17, 2019

(65) Prior Publication Data

US 2019/0273693 A1 Sep. 5, 2019

Related U.S. Application Data

(60) Provisional application No. 62/672,808, filed on May 17, 2018.

(51) Int. Cl.
*H04L 12/801* (2013.01)

(52) U.S. Cl.
CPC .............. *H04L 47/39* (2013.01); *H04L 47/12* (2013.01)

(58) Field of Classification Search
CPC ....... H04L 47/39; H04L 47/527; H04L 47/60; H04L 49/254; H04L 47/12
USPC ............................................... 370/230, 230.1
See application file for complete search history.

(56) References Cited

U.S. PATENT DOCUMENTS

| 2007/0174511 | A1* | 7/2007 | Yu | G06F 13/28 710/36 |
| 2009/0037440 | A1* | 2/2009 | Will | G06K 9/6219 |
| 2018/0278550 | A1* | 9/2018 | Rosen | H04L 47/34 |

OTHER PUBLICATIONS

Varghese, George, et al., "Hashed and Hierarchical Timing Wheels: Data Structures for the Efficient Implementation of a Timer Facility," Digital Equipment Corporation, Littleton, MA 01460, 1987, pp. 25-38.

* cited by examiner

*Primary Examiner* — Melvin C Marcelo
*Assistant Examiner* — Natali Pascual Peguero
(74) *Attorney, Agent, or Firm* — Compass IP Law, PC

(57) ABSTRACT

Technologies for pacing network packet transmissions include a computing device. The computing device includes a compute engine and a network interface controller (NIC). The NIC is to select a first transmit descriptor from a window of transmit descriptors. The first transmit descriptor is associated with a packet stream. The NIC is also to identify a node of a plurality of nodes of a hierarchical scheduler. The node is associated with the selected first transmit descriptor. The NIC is also to determine whether the identified node has a target amount of transmission credits available and transmit, in response to a determination that the identified node has a target amount of transmission credits available, the network packet associated with the first transmit descriptor to a target computing device.

17 Claims, 6 Drawing Sheets

TECHNOLOGIES FOR PACING NETWORK PACKET TRANSMISSIONS

CROSS-REFERENCE TO RELATED APPLICATION

This application claims the benefit of U.S. Provisional Patent Application 62/672,808 filed May 17, 2018.

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Certain conditions of the network and/or available resources of the computing devices can adversely impact the flow of network traffic. For example, the network packets may be transmitted in bursts at rates higher than can be supported by the receiving computing device and/or any other network computing devices therebetween. Such network traffic bursts may cause congestion at various points (i.e., network devices, destination computing device, etc.) across the network, which may result in a reduced overall network efficiency caused by network packet queueing delays, network packet loss, and decreased throughput, for example. For example, the computing devices are typically configured to transmit a maximum number of network packets in the order they were received. However, doing so can result in blocks of packets belonging to the same flow being clumped together on the wire. Additionally, the ensuing congestion can cause a network packet drop, which can be detrimental to the flow.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
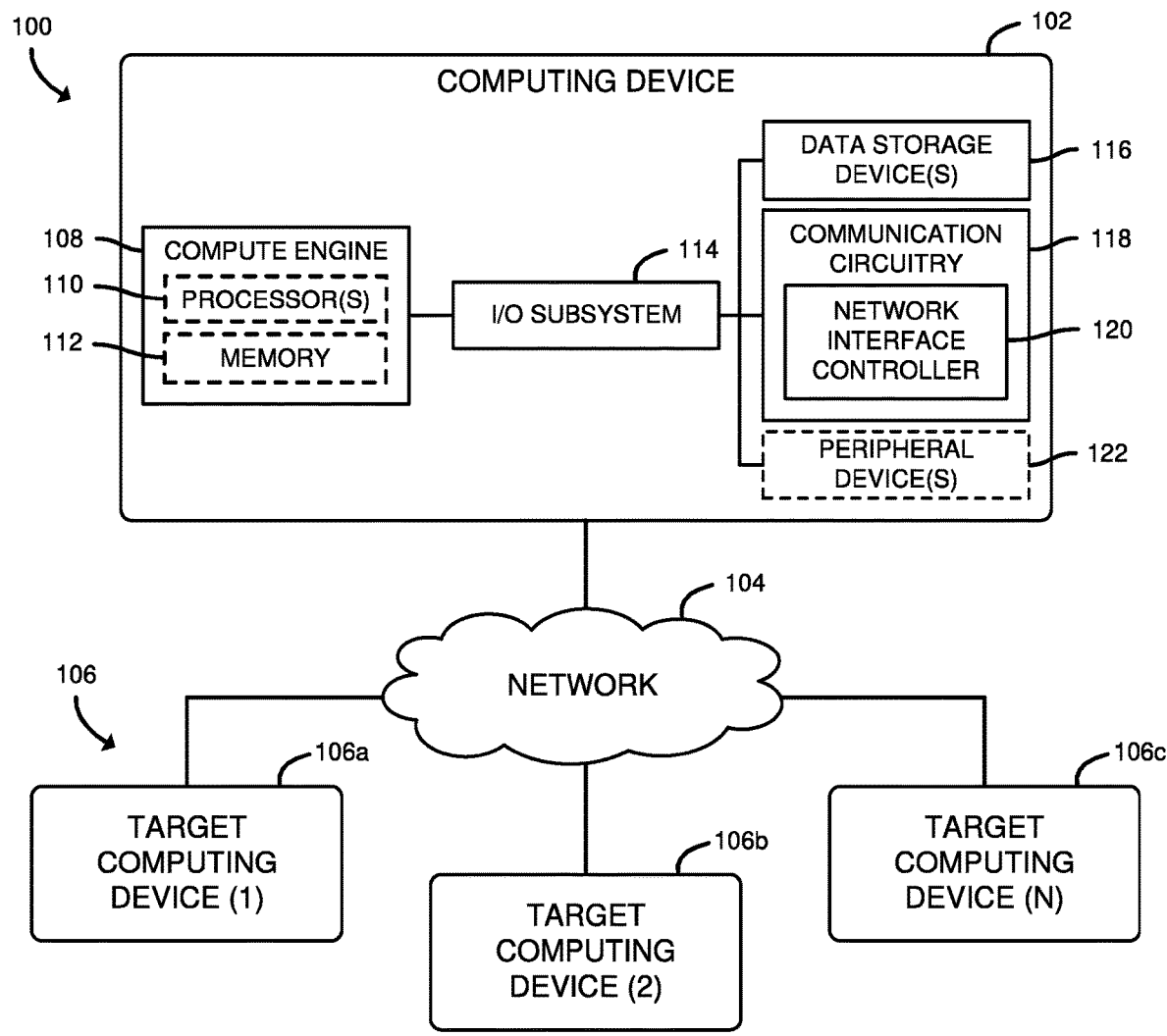
FIG. 1 is a simplified block diagram of at least one embodiment of a system for pacing network packet transmissions that includes a computing device communicatively coupled to multiple target computing devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for pacing network packet transmissions includes a computing device 102 communicatively coupled to multiple target computing devices 106 via a network 104. In use, the computing device 102 generates and transmits network packets (e.g., data packets, Ethernet frames, etc.) to a target computing device, such as one of the illustrative target computing devices 106. As illustratively shown, the system 100 includes a first target computing device 106, designated as target computing device (1) 106a, a second target computing device 106, designated as target computing device (2) 106b, and a third target computing device 106, designated as target computing device (N) 106c (e.g., in which the target computing device (N) 102c represents the "Nth" target computing device 106 and "N" is a positive integer).

The computing device 102 is configured to control the rate of network traffic (i.e., pace streams of network packets) sent by a network interface controller (NIC) of the computing device 102 (e.g., the NIC 120 of the illustrative computing device 102 of FIG. 1). To do so, and as described in further detail below, the computing device 102 is configured to employ hardware that, in the illustrative embodiment, uses a tree-based hierarchical scheduler (e.g., a scheduler that utilizes a tree data structure in which leaf nodes (e.g., elements of the tree data structure that may contain a value or data) are connected to other elements of the tree data structure by edges defining a hierarchy) to select the next transmit queue to process, such that the computing device 102 can service transmit queues of the NIC 120 out of order. Additionally, the computing device 102 is configured to associate a scheduler leaf node of the tree-based hierarchical scheduler with a respective transmit flow/stream of a plurality of transmit flows/streams managed by the computing device 102. Further, the computing device 102 is configured to associate each scheduler leaf node with an assigned pacing rate. In other words, the pacing rate of each scheduler leaf node is associated with a transmit flow/stream, rather than an entire transmit queue.

The computing device 102 is configured to issue transmit credits from the root of the scheduler tree out to the scheduler leaf nodes based on the aforementioned pacing rates (i.e., rate limits). In order to support multiple rate limits for a single transmit queue, the computing device 102 is configured to associate a transmission queue with multiple scheduler leaf nodes. Accordingly, when a scheduler leaf node has credits and wins arbitration (see, e.g., the method 500 of FIG. 5), the associated transmit queue is processed. It should be appreciated that the individual transmit elements in the transmit queue are described by a descriptor and the associated transmit buffer (i.e., in which data of the network packet is temporarily stored). It should be further appreciated that the thread that populates the transmit queue may write the transmit buffers and descriptors in as they arrive into the transmit queue. Further, as hardware completes the descriptors it moves the tail and pushes the transmit completion into a transmit queue. Accordingly, if the queue fills up without any descriptor completions, the tail would have moved all the way to the end of the descriptor ring. Under such conditions, the software may choose to drop a transmit request, if the software were programmed to do so. Alternately, it may request to be reset.

The employed hardware of the computing device 102 is configured to service the transmit queue in order, follow the instructions in the descriptor to perform any offload processes/operation (e.g., segment the network packet, apply a checksum, etc.), and signal the completion thereof in the descriptor. To do so, as will also be described in further detail below, the capabilities of the transmit queue may be extended such that the employed hardware is further configured to review a set of transmit descriptors in a queue and make a decision to process one or more at a time. In some embodiments, the employed hardware can be augmented to partially process multiple-descriptors from different streams, rather than completing one descriptor before going to the next. To do so, the computing device 102 is configured to review a window of descriptors at a given point in time (e.g., each credit cycle) to identify the subset of descriptors to be processed. In some embodiments, software of the computing device 102 may write to a tail register to add work and hardware of the computing device 102 may write to a head register to indicate completed work. It should be appreciated that, in practice, variations of this scheme may be used.

The computing device 102 may be embodied as any type of computation or computer device capable of performing the functions described herein, including, without limitation, a server (e.g., stand-alone, rack-mounted, blade, sled, etc.), a sled (e.g., a compute sled, a storage sled, an accelerator sled, etc.), a switch (e.g., a disaggregated switch, a rack-mounted switch, a standalone switch, a fully managed switch, a partially managed switch, a full-duplex switch, and/or a half-duplex communication mode enabled switch), a router, a network appliance (e.g., physical or virtual), a web appliance, a distributed computing system, a processor-based system, and/or a multiprocessor system. The illustrative computing device 102 includes a compute engine 108, an I/O subsystem 114, one or more data storage devices 116, communication circuitry 118, and, in some embodiments, one or more peripheral devices 122. It should be appreciated that the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor capable of performing the functions described herein. For example, the processor(s) 110 may be embodied as one or more single-core processors, multi-core processors, digital signal processors (DSPs), microcontrollers, or other processor or processing/controlling circuit(s). In some embodiments, the processor(s) 110 may be embodied as, include, or otherwise be coupled to an FPGA, an ASIC, reconfigurable hardware or hardware circuitry, or other specialized hardware to facilitate performance of the functions described herein.

The memory 112 may be embodied as any type of volatile or non-volatile memory, or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). It should be appreciated that the memory 112 may include main memory (i.e., a primary memory) and/or cache memory (i.e., memory that can be accessed more quickly than the main memory).

The compute engine 108 is communicatively coupled to other components of the computing device 102 via the I/O subsystem 114, which may be embodied as circuitry and/or components to facilitate input/output operations with the processor 110, the memory 112, and other components of the computing device 102. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the computing device 102, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the computing device 102 and other computing devices (e.g., the target computing devices 106), as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including processing network packets (e.g., parse received network packets, identify flows/streams of network packets, determine target computing devices for network packets, forward the network packets to a particular buffer queue of a respective host buffer of the computing device 102, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the computing device 102 (e.g., incorporated on a single integrated circuit chip along with a processor 110, the memory 112, and/or other components of the computing device 102). Alternatively, in some embodiments, the specialized circuitry, hardware, or combination thereof may be embodied as one or more discrete processing units of the computing device 102, each of which may be capable of performing one or more of the functions described herein.

The illustrative communication circuitry 118 includes a NIC 120, also commonly referred to as a host fabric interface (HFI) in some embodiments (e.g., high-performance computing (HPC) environments). The NIC 120 may be embodied as one or more add-in-boards, daughtercards, network interface cards, controller chips, chipsets, or other devices that may be used by the computing device 102. In some embodiments, the NIC 120 may be embodied as part of a system-on-a-chip (SoC) that includes one or more processors, or included on a multichip package that also contains one or more processors. In some embodiments, the NIC 120 may include a local processor (not shown) and/or a local memory (not shown) that are both local to the NIC 120. In such embodiments, the local processor of the NIC 120 may be capable of performing one or more of the functions of a processor 110 described herein.

Additionally or alternatively, in such embodiments, the local memory of the NIC 120 may be integrated into one or more components of the computing device 102 at the board level, socket level, chip level, and/or other levels. For example, in some embodiments, the NIC 120 may be integrated with the processor 110, embodied as an expansion card coupled to the I/O subsystem 114 over an expansion bus (e.g., Peripheral Component Interconnect Express (PCIe)), part of a SoC that includes one or more processors, or included on a multichip package that also contains one or more processors. Additionally or alternatively, in some embodiments, functionality of the NIC 120 may be integrated into one or more components of the computing device 102 at the board level, socket level, chip level, and/or other levels. The functions of the NIC 120 and components that interact with the NIC 120 to perform the packet pacing operations described herein may, in some embodiments, be accelerated (e.g., performed faster than would be possible using a general purpose processor) using a specialized accelerator device (e.g., a field programmable gate array (FPGA), an application specific integrated circuit, etc.).

Referring back to FIG. 1, the network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, (high-speed) interconnects, etc.), as needed to facilitate communication between the computing devices 102 and the target computing devices 106, which are not shown to preserve clarity of the description.

Similar to the computing device 102, the target computing devices 106 may be embodied as any type of computation or computer device capable of performing the functions described herein, including, without limitation, a server (e.g., stand-alone, rack-mounted, blade, sled, etc.), a sled (e.g., a compute sled, a storage sled, an accelerator sled, etc.), switch (e.g., a disaggregated switch, a rack-mounted switch, a standalone switch, a fully managed switch, a partially managed switch, a full-duplex switch, and/or a half-duplex communication mode enabled switch), a router, a network appliance (e.g., physical or virtual), a web appliance, a distributed computing system, a processor-based system, and/or a multiprocessor system. Accordingly, it should be appreciated that the target computing devices 106 include similar and/or like components to that of the illustrative computing device 102 described above. As such, the descriptions of the like and/or similar components are not repeated herein for clarity of the description with the understanding that the description of the corresponding components provided above in regard to the computing device 102 applies equally to the corresponding components of the target computing devices 106. Of course, it should be appreciated that the target computing devices 106 may include additional and/or alternative components, depending on the embodiment. Additionally, it should be further appreciated that, in some embodiments, the target computing devices 106 may be configured to support the same or similar functionality as described herein as being performed by the computing device 102. In some embodiments, one or more of the devices 102, 106, 106*b*, 106*c* may be located in a data center, a base station, or similar facility.

Figure 2:
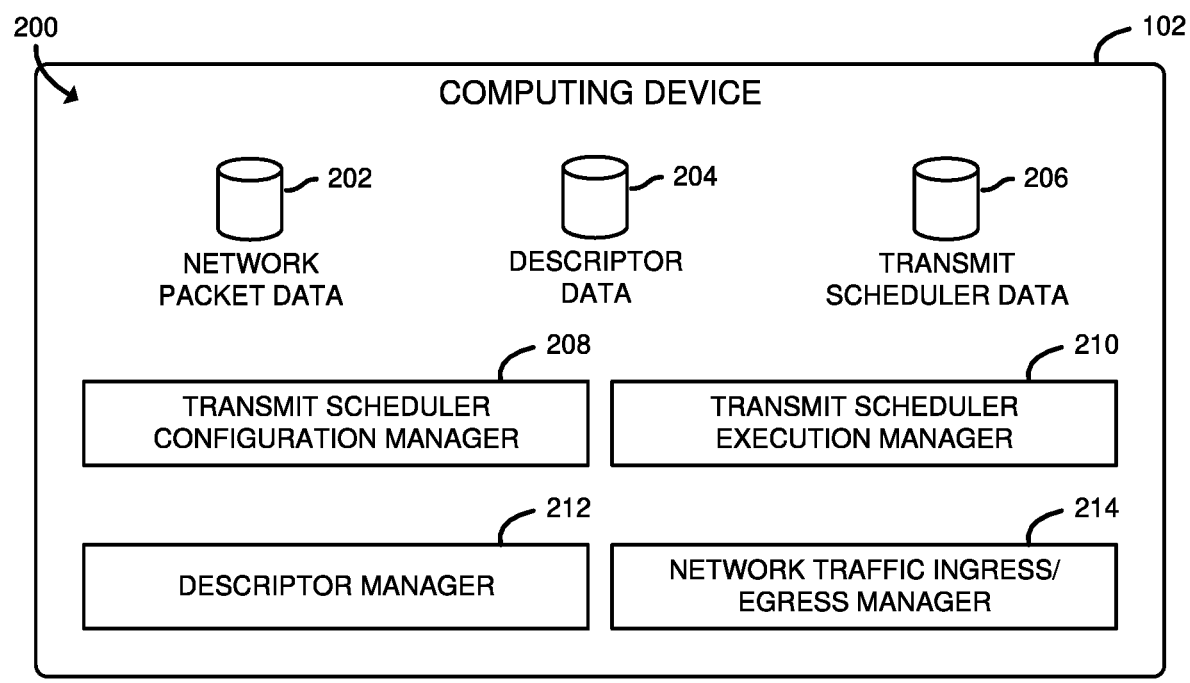
FIG. 2 is a simplified block diagram of at least one embodiment of an environment of a computing device of the system of FIG. 1.

Referring now to FIG. 2, in use, the computing device 102 establishes an environment 200 during operation. The illustrative environment 200 includes a transmit scheduler configuration manager 208, a transmit schedule execution manager 210, a descriptor manager 212, and a network traffic ingress/egress manager 214. The various components of the environment 200 may be embodied as hardware, firmware, software, or a combination thereof. For example, in some embodiments, one or more of the components of the environment 200 may be embodied as circuitry or collection of electrical devices (e.g., transmit scheduler configuration management circuitry 208, transmit schedule execution management circuitry 210, descriptor management circuitry 212, network traffic ingress/egress management circuitry 214, etc.). It should be appreciated that, in such embodiments, one or more of the transmit scheduler configuration management circuitry 208, the transmit schedule execution management circuitry 210, the descriptor management circuitry 212, and the network traffic ingress/egress management circuitry 214 may form a portion of one or more of the compute engine 108, the I/O subsystem 114, the communication circuitry 118 (e.g., the NIC 120 of the communication circuitry 118), and/or other components of the computing device 102.

In some embodiments, one or more as functions described herein may be performed or otherwise assisted by software executed on or by one or more of the components of the environment 200, including device drivers, applications, operating systems, etc. Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the compute engine 108 or other components of the computing device 102. It should be appreciated that the computing device 102 may include other components, sub-components, modules, sub-modules, logic, sub-logic, and/or devices commonly found in a computing device, which are not illustrated in FIG. 2 for clarity of the description.

In the illustrative environment 200, the computing device 102 additionally includes network packet data 202, descriptor data 204, and transmit scheduler data 206, each of which may be accessed by the various components and/or sub-components of the computing device 102. It should be appreciated that in some embodiments at least a portion of the data stored in, or otherwise represented by, the network packet data 202, the descriptor data 204, and/or the transmit scheduler data 206 may be stored in additional or alternative storage locations (e.g., host memory of the computing device 102). Additionally, it should be appreciated that in some embodiments the data stored in, or otherwise represented by, each of the network packet data 202, the descriptor data 204, and the transmit scheduler data 206 may not be mutually exclusive relative to each other. For example, in some implementations, data stored in the network packet data 202 may also be stored as a portion of the descriptor data 204 and/or the transmit scheduler data 206. As such, although the various data utilized by the computing device 102 is described herein as particular discrete data, such data may be combined, aggregated, and/or otherwise form portions of a single or multiple data sets, including duplicative copies, in other embodiments.

The transmit scheduler configuration manager 208, which may be embodied as hardware, firmware, software, virtualized hardware, emulated architecture, and/or a combination thereof as discussed above, is configured to manage the configuration of the scheduler tree. To do so, at initialization, the transmit scheduler configuration manager 208 is configured to advertise the maximum number of stream identifiers that the NIC 120 can rate limit. Additionally, the transmit scheduler configuration manager 208 is configured to identify the packet types and the packet parameters used to program the pacing characteristics. At runtime, the transmit scheduler configuration manager 208 is configured to assign a rate limit and unique identifier to each stream.

The transmit scheduler configuration manager 208 is further configured to configure a scheduler leaf node of a tree-based hierarchical scheduler with the assigned rate limit and associate the configured scheduler leaf node with a descriptor queue (e.g., a descriptor ring). One or more leaf nodes may be associated with a given descriptor queue. It should be appreciated that each scheduler node has quality of service (QoS) characteristics and pacing characteristics which can be used to limit the number of packets/second that can exit the transmit queue for each particular stream. Additionally, the transmit scheduler configuration manager 208 is configured to maintain a mapping table that maps one or more connection identifiers and a stream identifiers (i.e., an identifier tuple) to a leaf node. It should be appreciated that, in other embodiments, another identifier tuple (e.g., of additional and/or alternative header fields) may be used. In yet other embodiments other data usable for mapping a connection and a stream to a scheduler leaf node may be utilized, such as cookies and/or hashes. In some embodiments, the transmit scheduler configuration information may be stored in the transmit scheduler data 206.

The transmit schedule execution management circuitry 210, which may be embodied as hardware, firmware, software, virtualized hardware, emulated architecture, and/or a combination thereof as discussed above, is configured to manage the scheduling of network packets for transmission. To do so, the transmit schedule execution management circuitry 210 is configured to receive a generated network packet. Additionally, the transmit schedule execution management circuitry 210 is configured to receive the identifier tuple, or other identifying data, such as a cookie or hash, in out of band data associated with the received network packet. Depending on the conditions, the out of band data may optionally include a new rate limit for the stream. The transmit schedule execution management circuitry 210 is further configured to perform a lookup operation to identify the scheduler leaf node and descriptor queue associated with the stream to which the received network packet corresponds.

The transmit schedule execution management circuitry 210 is additionally configured to update a rate limit, as may be requested from time to time. For example, a rate limit update request for a given stream may be received in response to network congestion, or other protocol or implementation factors. Under such conditions in which the rate limit update request has been received, the transmit schedule execution management circuitry 210 is configured to update the corresponding scheduler leaf node before transmitting a notification that a new descriptor, or descriptors, have been generated.

Additionally, the transmit schedule execution management circuitry 210 is configured to manage the transmission of network packets based on credits associated with each scheduler leaf node. To do so, the transmit schedule execution management circuitry 210 is configured to maintain a window of transmit descriptors (e.g., 32, 64, 128, etc.) to review for transmission during a given credit cycle. In other words, the transmit schedule execution management circuitry 210 is configured to get the transmit descriptor information for a number of network packets (i.e., based on the transmit descriptor window size) to identify one or more transmit streams. Upon identification of the streams, or more particularly the scheduler leaf nodes associated therewith, the transmit schedule execution management circuitry 210 is configured to determine whether a matching scheduler leaf node has any credits. The window may move when the hardware has fetched a descriptor at the beginning of the window. In other words, when the hardware fetches the first descriptor in the window, it may add one more descriptors to the end of the window (e.g., provided that the descriptor has been supplied by software). Furthermore, if the window was not at maximum size, the hardware may add new descriptors to the end of the window as soon as the software provides descriptors.

If the matching scheduler leaf node is determined to have credits and wins arbitration, the transmit schedule execution management circuitry 210 is configured to fetch descriptors corresponding to the transmit descriptor window size and review each of the descriptors for a matching scheduler leaf node identifier. Additionally, if a descriptor with a matching scheduler leaf node is found, the transmit schedule execution management circuitry 210 is configured to transmit the descriptor (e.g., in first-in-first-out order (FIFO)) until credits are exhausted or the end of the transmit descriptor window is reached. It should be appreciated that, in some embodiments, if a matching scheduler leaf node is not found, the transmit schedule execution management circuitry 210 may be configured to use the credits for the next credit cycle. The transmit schedule execution management circuitry 210 is further configured to insert completed descriptors into a completion queue and move the head index of the transmit queue to the next uncompleted descriptor. As such, the transmit queue is opened for a new descriptor.

The descriptor management circuitry 212, which may be embodied as hardware, firmware, software, virtualized hardware, emulated architecture, and/or a combination thereof as discussed above, is configured to manage the descriptors for each network packet that is to be transmitted by the computing device 102. To do so, the descriptor management circuitry 212 is configured to program the descriptors for each network packet and include, in the descriptor, a scheduler leaf node identifier associated with the stream to which the network packet corresponds. In some embodiments, the descriptors may be stored in the descriptor data 204.

The network traffic ingress/egress manager 214, which may be embodied as hardware, firmware, software, virtualized hardware, emulated architecture, and/or a combination thereof as discussed above, is configured to receive inbound and route/transmit outbound network traffic. To do so, the network traffic ingress/egress manager 214 is configured to facilitate inbound/outbound network communications (e.g., network traffic, network packets, network flows, etc.) to and from the computing device 102. For example, the network traffic ingress/egress manager 214 is configured to manage (e.g., create, modify, delete, etc.) connections to physical and virtual network ports (i.e., virtual network interfaces) of the computing device 102 (e.g., via the communication circuitry 118, the NIC 120, etc.), as well as the ingress/egress buffers/queues associated therewith.

In particular, the network traffic ingress/egress manager 214 is configured to manage the transmit queues of network packets to be transmitted (e.g., to the target computing devices 106). To do so, the network traffic ingress/egress manager 214 is configured to identify which egress buffer is associated with the applicable target computing device 106. In some embodiments, information associated with the header(s) and/or the payload of the network communications (e.g., messages, data, etc.) may be stored in the network packet data 202. Additionally or alternatively, in some embodiments, the transmit queues may be stored in the network packet data 202.

Figure 3:
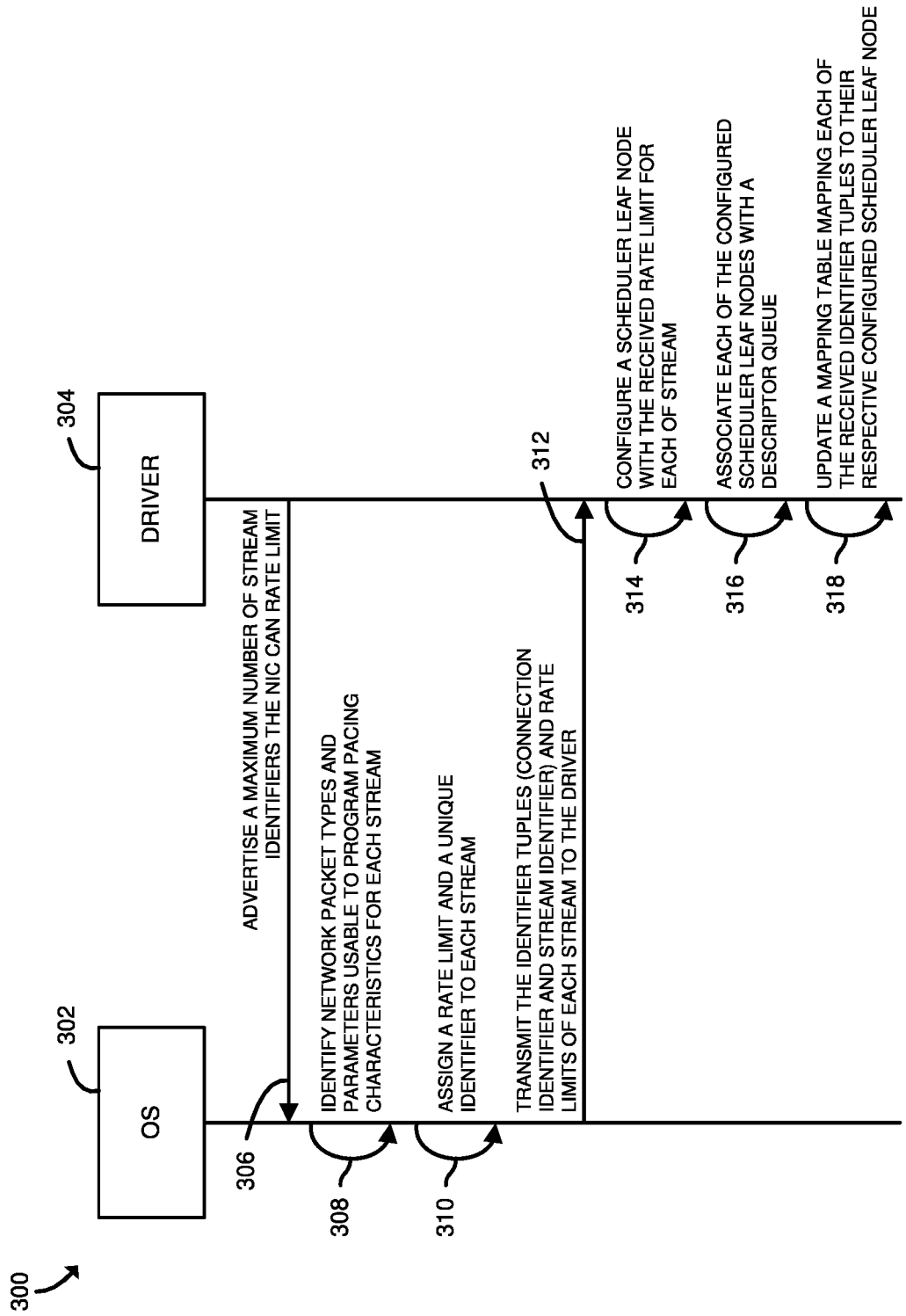
FIG. 3 is a simplified flow diagram of at least one embodiment of a communication flow for illustrating a configuration of scheduler leaf nodes of a tree-based hierarchical scheduler that may be executed by the computing device of FIGS. 1 and 2.

Referring now to FIG. 3, an embodiment of an illustrative communication flow 300 for configuring the scheduler leaf nodes of a tree-based hierarchical scheduler includes an operating system (OS) 302 and a driver 304 (i.e., a driver of the NIC 120) of the computing device 102. It should be appreciated that the operations described herein as being performed by the OS 302 may be more particularly performed by an implementation of a protocol stack, or network stack. The illustrative communication flow 300 includes a number of data flows, some of which may be executed separately or together, depending on the embodiment. In data flow 306, the driver 304 advertises the maximum number of stream identifiers that the device (i.e., the NIC 120) can rate limit. It should be appreciated that the OS 302 may use software rate limiting for any streams beyond the number of streams supported by the NIC 120. In data flow 308, the OS 302 identifies the packet types and the packet parameters used to program the pacing characteristics.

In data flow 310, the OS 302 assigns a rate limit and unique identifier to each stream. In data flow 312, the OS 302 communicates the identifier tuple (e.g., the connection identifier and the stream identifier) or other identifying data, such as a cookie or hash, and rate limit to the driver 304. In data flow 314, the driver 304 configures a scheduler leaf node with the requested rate limit. In data flow 316, the driver 304 associates the scheduler leaf node with a descriptor queue. In data flow 316, the driver 304 updates a mapping table which maps the identifier tuples, or other identifying data, such as one or more cookies or hashes, to the respective scheduler leaf nodes.

Figure 4:
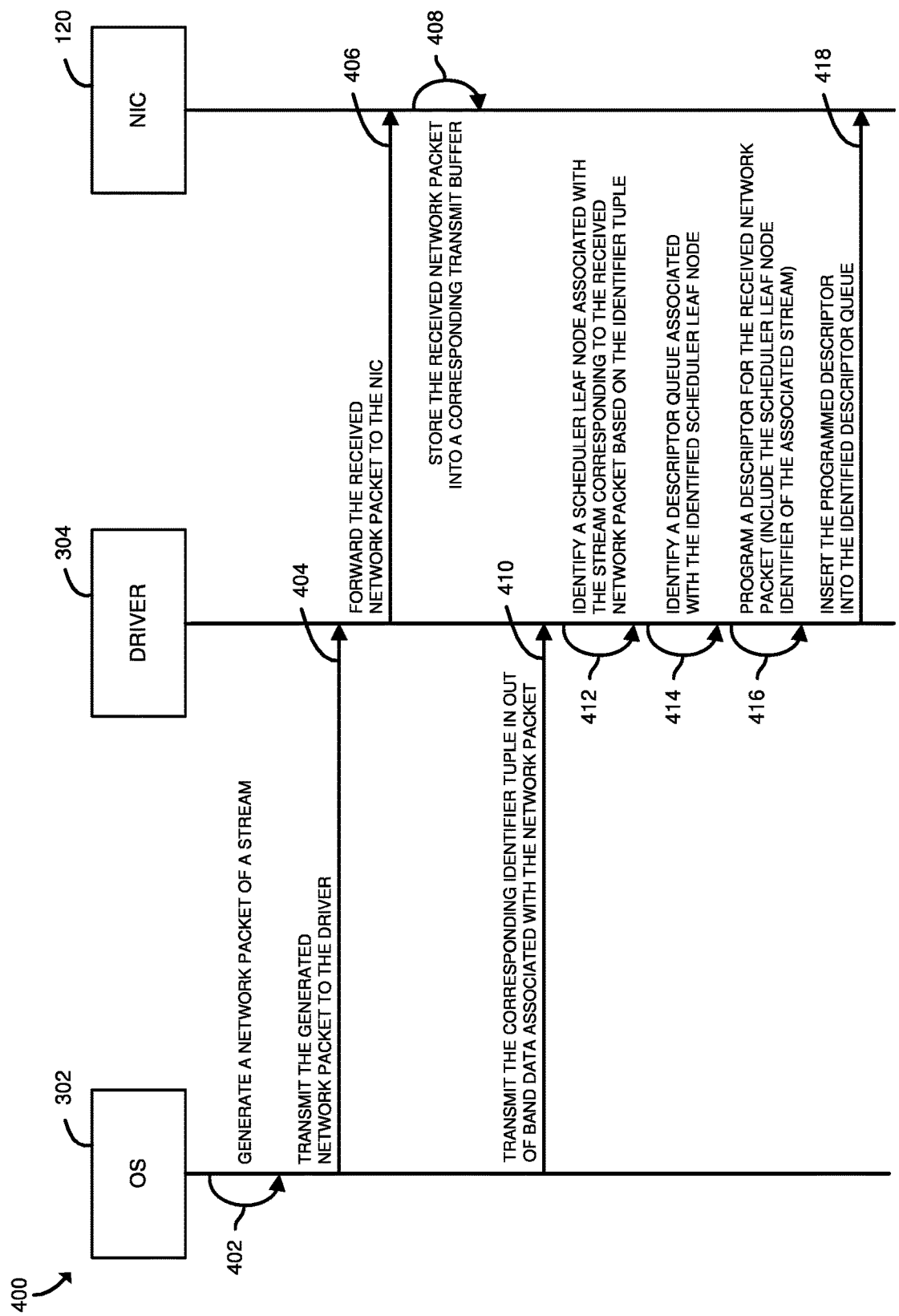
FIG. 4 is a simplified flow diagram of at least one embodiment of a communication flow for illustrating the queuing of network packets into a descriptor queue as a function of an associated scheduler leaf node of the tree-based hierarchical scheduler that may be executed by the computing device of FIGS. 1 and 2.

Referring now to FIG. 4, an embodiment of an illustrative communication flow 400 for queuing of network packets into a descriptor queue includes the operating system (OS) 302 and the driver 304 (i.e., a driver of the NIC 120) of the computing device 102. As described above, it should be appreciated that the operations described herein as being performed by the operating system 302 may be more particularly performed by an implementation of a protocol stack, or network stack. The illustrative communication flow 400 includes a number of data flows, some of which may be executed separately or together, depending on the embodiment. In data flow 402, the OS 302 generates a network packet of a stream. In data flow 404, the OS 302 transmits the generated network packet to the driver 304. In data flow 406, the driver 304 forwards the received network packet to the NIC 120. In data flow 408, the NIC 120 stores the received network packet into a corresponding transmit buffer.

As described previously in data flow 404, the OS 302 transmits the generated network packet to the driver 304. Additionally, in data flow 410, the OS 302 includes the identifier tuple (e.g., the connection identifier and the stream identifier, or additional/alternate unique identifier(s)), or other identifying data, such as one or more cookies or hashes, in out of band data associated with the received network packet. The out of band data may optionally include a new rate limit for the stream. In data flow 412, the driver 304 looks up the scheduler leaf node associated with the stream corresponding to the received network packet based on the identifier tuple or other identifying data (e.g., one or more cookies or hashes). In data flow 414, the driver 304 identifies the descriptor queue associated with the stream of the received network packet. In data flow 416, the driver 304 programs the descriptors for the received network packet to include a scheduler leaf node identifier. In data flow 418, the driver 304 inserts the programmed descriptor into the identified descriptor queue. In some embodiments, the operations in flows 404 and 406 may occur after the operations of flow 418, when the hardware selects the packet for transmission based on the pacing (e.g., the scheduler leaf node wins the scheduling algorithm over its siblings and peers).

As described previously, the out of band data may optionally include a new rate limit for the stream. If so, the driver 304 updates the rate limit by updating the scheduler leaf node before transmitting a notification (e.g., to the NIC 120) that a new descriptor is ready. It should be appreciated that the OS 302 may include the new rate limit for a given stream in response to network congestion, or other protocol or implementation factors. Additionally, it should be appreciated that to optimize fetching the descriptor, the NIC 120 may provide a technique for the driver 304 to provide stream hints. For example, a tail register may be extended so the driver 304 can indicate via a bitmap which streams are included in the batch of descriptors associated with the tail write.

Figure 5:
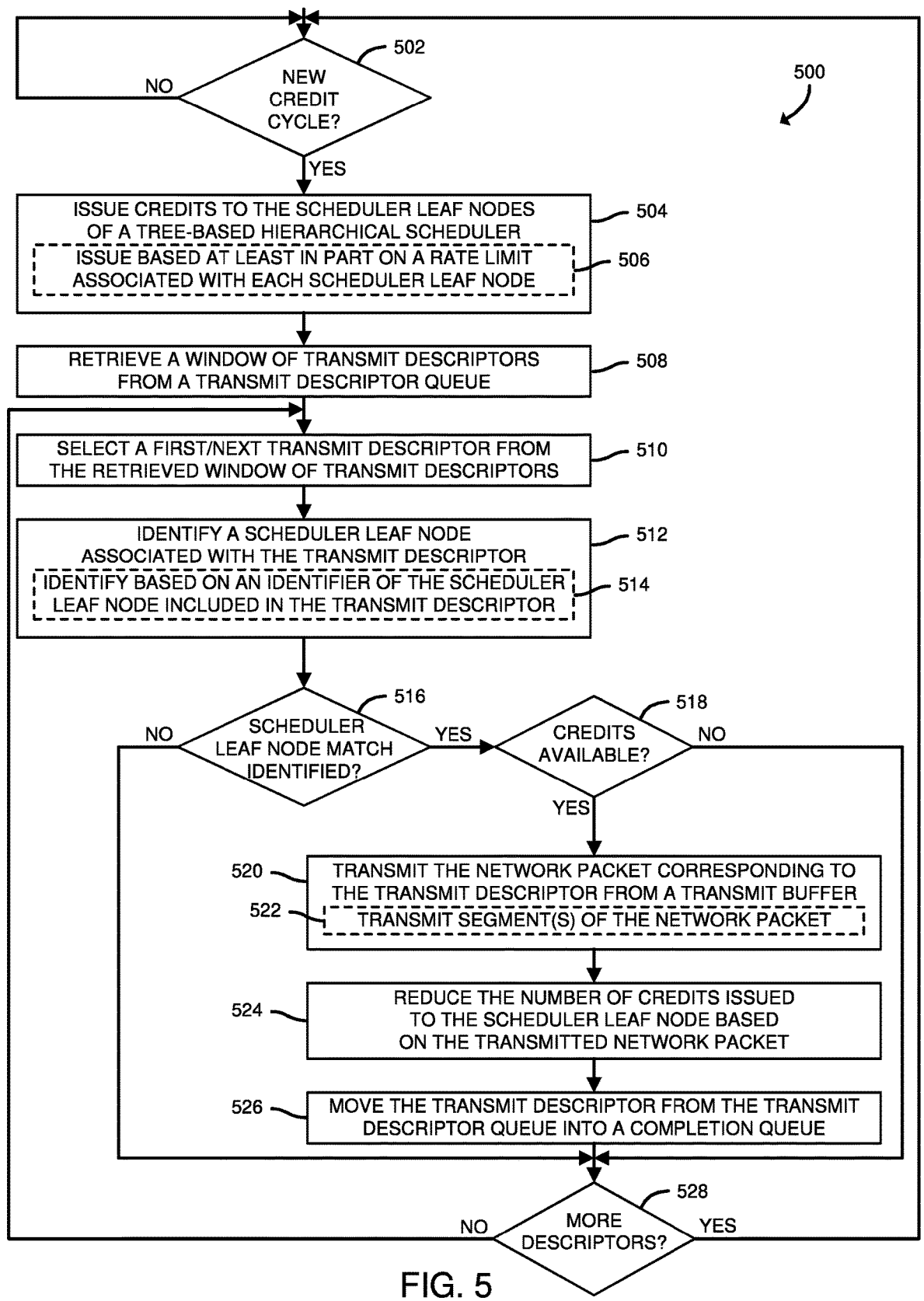
FIG. 5 is a simplified flow diagram of at least one embodiment of a method for pacing network packet transmissions that may be executed by the computing device of FIGS. 1 and 2.

Referring now to FIG. 5, a method 500 for pacing network packet transmissions is shown which may be executed by the computing device 102, or more particularly by one or more components of the computing device 102 as described herein in FIGS. 2-4. The method 500 begins with block 502, in which the computing device 102 determines whether a new credit cycle has been initiated. If so, in block 504, the computing device 102 issues transmission credits to the scheduler leaf nodes of a tree-based hierarchical scheduler. To do so, in block 506, the computing device 102 may issue the transmission credits based at least in part on a rate limit associated with each scheduler leaf node. In block 508, the computing device 102 retrieves a window of transmit descriptors from a transmit descriptor queue (see, e.g., the descriptor window 604 of the transmit descriptor queue 602 of FIG. 6).

In block 510, the computing device 102 selects a first transmit descriptor from the retrieved window of transmit descriptors (i.e., transmit descriptor window). In block 512, the computing device 102 identifies a scheduler leaf node associated with the transmit descriptor. To do so, in block 514, the computing device 102 may identify the scheduler leaf node based on an identifier of the scheduler leaf node included in the descriptor. In block 516, the computing device 102 determines whether a scheduler leaf node match has been identified. If not, the method 500 branches to block 528 which is described below; otherwise, the method 500 branches to block 518. In block 518, the computing device 102 determines whether the identified scheduler leaf node has a target amount of available transmission credits (i.e., a sufficient number of credits to send the network packet).

If not, the method 500 branches to block 528, which is described below; otherwise, if the computing device 102 determines transmission credits are available, the method 500 branches to block 520. In block 520, the computing device 102 transmits the network packet corresponding to the transmit descriptor from a transmit buffer. In other words, the network packet associated with the transmit descriptor can be transmitted if the transmit descriptor is within the transmit descriptor review window and the scheduler leaf node associated with the stream has sufficient available credits. It should be appreciated that the computing device 102 is capable of segmenting (TSO) a single large upper layer protocol network packet into several smaller packets to align with the network's maximum segment size. In other words, the network packet may require segmentation. Additionally or alternatively, the scheduler node may not have enough credits to transmit the entire packet. Accordingly, under certain conditions, in block 522, the computing device 102 may transmit as many full segments as allowed with the available credits. It should be appreciated that transmission of the large packet can be resumed next time that scheduler leaf node is scheduled.

In block 524, the computing device 102 reduces the number of credits issued to the scheduler leaf node based on the transmitted network packet size (e.g., based on the amount of data transmitted, based on the number of segments transmitted, based on the network packet having been transmitted, etc.). In block 526, the computing device 102 moves the transmit descriptor from the transmit descriptor queue into a completion queue. In block 528, the computing device 102 determines whether the end of the transmit descriptor window has been reached. If so, the method 500 returns back to block 502 to wait for the next credit cycle; otherwise, the method 500 returns back to block 510 to select the next transmit descriptor from the retrieved transmit descriptor window.

Figure 6:
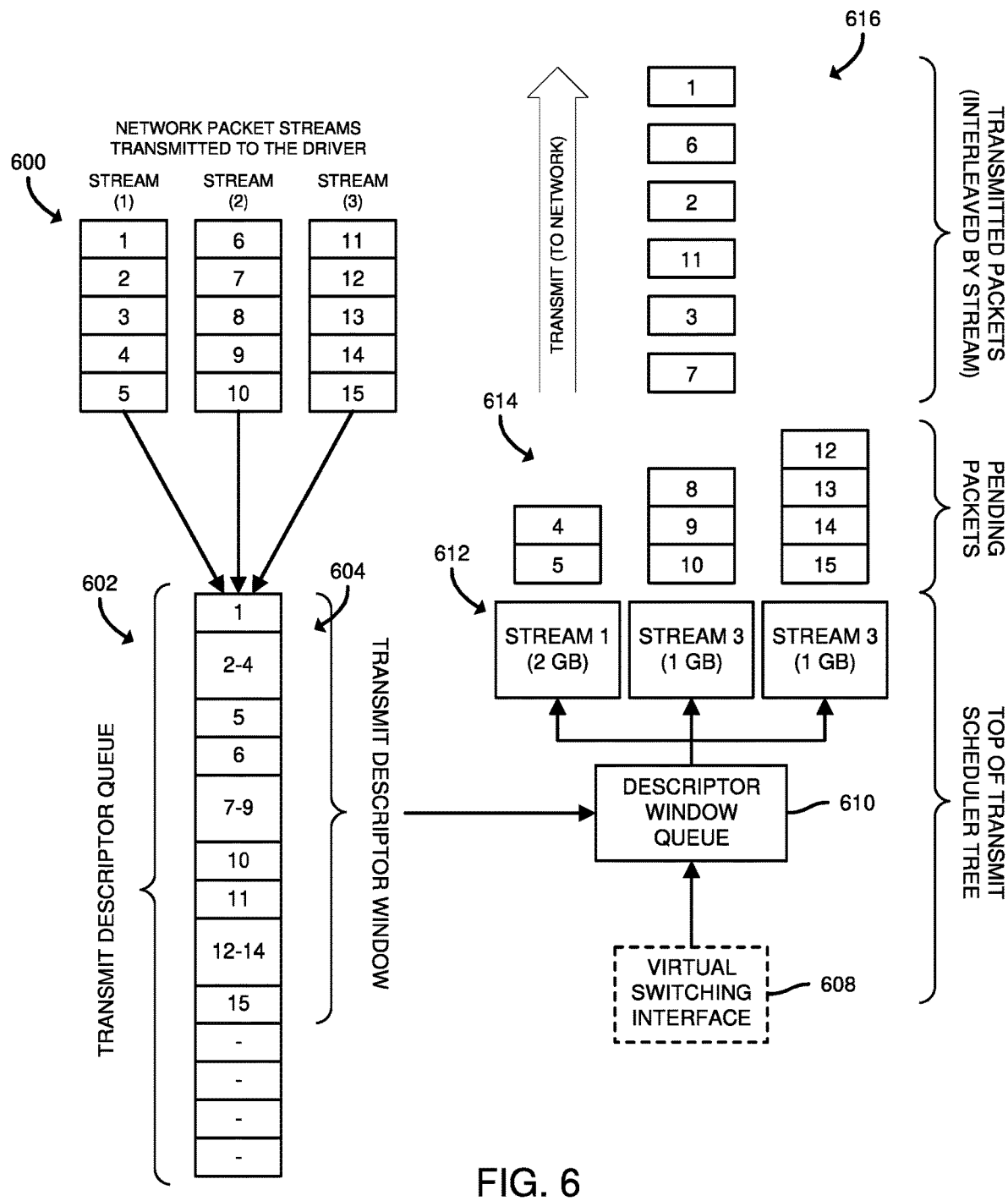
FIG. 6 is a simplified block diagram illustrating multiple streams of network packets being paced to a network.

Referring now to FIG. 6, an illustrative block diagram is shown which includes multiple streams 600 of network packets. While the illustrative streams 600 includes three streams, it should be appreciated that an additional number of streams 600 may be supported in other embodiments. Further, while each of the streams 600 illustratively include five network packets, it should be appreciated that each of the streams may include more or fewer network packets, in other embodiments. As illustratively shown, each of the streams 600 feed transmit descriptors associated with the network packets into a transmit descriptor queue 602 when a descriptor has been successfully written for a particular network packet of the streams.

As described previously during each credit cycle, a transmit descriptor window 604 is selected from the transmit descriptor queue 602. As illustratively shown, the transmit descriptor window 604 is transferred to a descriptor window queue 610 at the top of the transmit scheduler tree. In some embodiments, the top of the transmit scheduler tree may include a virtual switching interface (VSI) 608 to assist with the routing decision logic. Each of the illustrative scheduler leaf nodes 612 are rate limited, with the assigned rate limits shown in parenthesis of each respective scheduler leaf node 612. As such, it should be appreciated that despite each stream having the same number of descriptors having been represented in the illustrative transmit descriptor window 604, the number of pending packets 614 presently enqueued may vary.

Accordingly, it should be appreciated that network packets from a stream can be transmitted out of order (see, e.g., the transmitted packets 616, which have been interleaved by stream). However, it should be further appreciated that ordering is maintained for each stream within each queue (see, e.g., the pending packets 614). As such, as illustratively shown, network packets from different streams in a queue can be interleaved (i.e., based on when the transmit scheduler selects each stream's scheduler leaf node). The scheme described above allows for packets from the same stream to always be transmitted in order. However, some embodiments may loosen this requirement (e.g., packets need not always be transmitted in order) for one or more protocols. It should be understood that while a tree structure with leaf nodes is described above, in other embodiments, the system 100 may use different data structures to pace network packet transmissions.

EXAMPLES

Illustrative examples of the technologies disclosed herein are provided below. An embodiment of the technologies may include any one or more, and any combination of, the examples described below.

Example 1 includes a computing device for pacing network packet transmissions, the computing device comprising a compute engine; and a network interface controller (NIC) to select a first transmit descriptor from a window of transmit descriptors, wherein the first transmit descriptor is associated with a packet stream; identify, in a plurality of nodes of a hierarchical scheduler, a node associated with the selected first transmit descriptor; determine whether the identified node has a target amount of transmission credits available; and transmit, in response to a determination that the identified node has a target amount of transmission credits available, the network packet associated with the first transmit descriptor to a target computing device.

Example 2 includes the subject matter of Example 1, and wherein the NIC is further to retrieve the window of transmit descriptors from a transmit descriptor queue and the transmit descriptor queue includes transmit descriptors for multiple different packet streams.

Example 3 includes the subject matter of any of Examples 1 and 2, and wherein the NIC is further to move the transmit descriptor from the transmit descriptor queue into a completion queue after the network packet has been transmitted.

Example 4 includes the subject matter of any of Examples 1-3, and wherein to identify a node of a plurality of nodes of a hierarchical scheduler comprises to identify a scheduler leaf node of a plurality of scheduler leaf nodes of a tree-based hierarchical scheduler.

Example 5 includes the subject matter of any of Examples 1-4, and wherein the NIC is further to issue one or more credits to at least one scheduler leaf node of the plurality of scheduler leaf nodes.

Example 6 includes the subject matter of any of Examples 1-5, and wherein to issue the one or more credits to at least one scheduler leaf node of the tree-based hierarchical scheduler comprises to issue the one or more credits as a function of a rate limit associated with each scheduler leaf node.

Example 7 includes the subject matter of any of Examples 1-6, and wherein to determine whether the identified node has a target amount of transmission credits available comprises to identify a size of the network packet associated with the first transmit descriptor; and determine whether an amount of transmission credits presently assigned to the identified node is sufficient to transmit the network packet to the target computing device.

Example 8 includes the subject matter of any of Examples 1-7, and wherein the NIC is further to segment the network packet into a plurality of network packet segments and wherein to transmit the network packet associated with the first transmit descriptor to the target computing device comprises to transmit at least one segment of the plurality of network packet segments to the target computing device based on the amount of transmission credits presently assigned to the identified node.

Example 9 includes the subject matter of any of Examples 1-8, and wherein the NIC is further to reduce the number of credits issued to the identified node based on a size of the transmitted network packet.

Example 10 includes the subject matter of any of Examples 1-9, and wherein to identify the node associated with the selected first transmit descriptor comprises to identify the node based on an identifier of the node in the transmit descriptor.

Example 11 includes one or more machine-readable storage media comprising a plurality of instructions stored thereon that, in response to being executed, cause a network interface controller (NIC) to select a first transmit descriptor from a window of transmit descriptors, wherein the first transmit descriptor is associated with a packet stream; identify, in a plurality of nodes of a hierarchical scheduler, a node associated with the selected first transmit descriptor; determine whether the identified node has a target amount of transmission credits available; and transmit, in response to a determination that the identified node has a target amount of transmission credits available, the network packet associated with the first transmit descriptor to a target computing device.

Example 12 includes the subject matter of Example 11, and wherein the instructions further cause the NIC to retrieve the window of transmit descriptors from a transmit descriptor queue and the transmit descriptor queue includes transmit descriptors for multiple different packet streams.

Example 13 includes the subject matter of any of Examples 11 and 12, and wherein the instructions further cause the NIC to move the transmit descriptor from the transmit descriptor queue into a completion queue after the network packet has been transmitted.

Example 14 includes the subject matter of any of Examples 11-13, and wherein to identify a node of a plurality of nodes of a hierarchical scheduler comprises to identify a scheduler leaf node of a plurality of scheduler leaf nodes of a tree-based hierarchical scheduler.

Example 15 includes the subject matter of any of Examples 11-14, and wherein the instructions further cause the NIC to issue one or more credits to at least one scheduler leaf node of the plurality of scheduler leaf nodes.

Example 16 includes the subject matter of any of Examples 11-15, and wherein to issue the one or more credits to at least one scheduler leaf node of the tree-based hierarchical scheduler comprises to issue the one or more credits as a function of a rate limit associated with each scheduler leaf node.

Example 17 includes the subject matter of any of Examples 11-16, and wherein to determine whether the identified node has a target amount of transmission credits available comprises to identify a size of the network packet associated with the first transmit descriptor; and determine whether an amount of transmission credits presently assigned to the identified node is sufficient to transmit the network packet to the target computing device.

Example 18 includes the subject matter of any of Examples 11-17, and wherein the instructions further cause the NIC to segment the network packet into a plurality of network packet segments and wherein to transmit the network packet associated with the first transmit descriptor to the target computing device comprises to transmit at least one segment of the plurality of network packet segments to the target computing device based on the amount of transmission credits presently assigned to the identified node.

Example 19 includes a method comprising selecting, by a network interface controller (NIC), a first transmit descriptor from a window of transmit descriptors, wherein the first transmit descriptor is associated with a packet stream; identifying, by the NIC and in a plurality of nodes of a hierarchical scheduler, a node associated with the selected first transmit descriptor; determining, by the NIC, whether the identified node has a target amount of transmission credits available; and transmitting, by the NIC and in response to a determination that the identified node has a target amount of transmission credits available, the network packet associated with the first transmit descriptor to a target computing device.

Example 20 includes the subject matter of Example 19, and further including retrieving, by the NIC, the window of transmit descriptors from a transmit descriptor queue, wherein the transmit descriptor queue includes transmit descriptors for multiple different packet streams.

The invention claimed is:

1. A computing device for pacing network packet transmissions, the computing device comprising:
a network interface controller (NIC) to:
retrieve a window of transmit descriptors from a transmit descriptor queue, the transmit descriptor queue including transmit descriptors for multiple different streams;
select a first transmit descriptor from the window of transmit descriptors, wherein the first transmit descriptor is associated with a stream;
identify, in a plurality of nodes of a hierarchical scheduler, a node associated with the selected first transmit descriptor;
determine whether the identified node has a target amount of transmission credits available; and
transmit, in response to a determination that the identified node has a target amount of transmission credits available, a network packet associated with the first transmit descriptor to a target computing device, network packets in the stream are transmitted in order interleaved with network packets from other streams in the transmit descriptor queue.

2. The computing device of claim 1, wherein the NIC is further to move the first transmit descriptor from the transmit descriptor queue into a completion queue after the network packet has been transmitted.

3. The computing device of claim 1, wherein to identify a node of a plurality of nodes of a hierarchical scheduler comprises to identify a scheduler leaf node of a plurality of scheduler leaf nodes of a tree-based hierarchical scheduler.

4. The computing device of claim 3, wherein the NIC is further to issue one or more credits to at least one scheduler leaf node of the plurality of scheduler leaf nodes.

5. The computing device of claim 4, wherein to issue the one or more credits to at least one scheduler leaf node of the tree-based hierarchical scheduler comprises to issue the one or more credits as a function of a rate limit associated with each scheduler leaf node.

6. The computing device of claim 1, wherein to determine whether the identified node has a target amount of transmission credits available comprises to:
identify a size of the network packet associated with the first transmit descriptor; and
determine whether an amount of transmission credits presently assigned to the identified node is sufficient to transmit the network packet to the target computing device.

7. The computing device of claim 6, wherein the NIC is further to segment the network packet into a plurality of network packet segments and wherein to transmit the network packet associated with the first transmit descriptor to the target computing device comprises to transmit at least one segment of the plurality of network packet segments to the target computing device based on the amount of transmission credits presently assigned to the identified node.

8. The computing device of claim 1, wherein the NIC is further to reduce a number of credits issued to the identified node based on a size of the transmitted network packet.

9. The computing device of claim 1, wherein to identify the node associated with the selected first transmit descriptor comprises to identify the node based on an identifier of the node in the first transmit descriptor.

10. One or more machine-readable non-transitory storage media comprising a plurality of instructions stored thereon that, in response to being executed, cause a network interface controller (NIC) to:
retrieve a window of transmit descriptors from a transmit descriptor queue, the transmit descriptor queue including transmit descriptors for multiple different streams;
select a first transmit descriptor from the window of transmit descriptors, wherein the first transmit descriptor is associated with a stream;
identify, in a plurality of nodes of a hierarchical scheduler, a node associated with the selected first transmit descriptor;
determine whether the identified node has a target amount of transmission credits available; and
transmit, in response to a determination that the identified node has a target amount of transmission credits available, a network packet associated with the first transmit descriptor to a target computing device, network packets in the stream are transmitted in order interleaved with network packets from other streams.

11. The one or more machine-readable non-transitory storage media of claim 10, wherein the instructions further cause the NIC to move the first transmit descriptor from the transmit descriptor queue into a completion queue after the network packet has been transmitted.

12. The one or more machine-readable non-transitory storage media of claim 10, wherein to identify a node of a plurality of nodes of a hierarchical scheduler comprises to identify a scheduler leaf node of a plurality of scheduler leaf nodes of a tree-based hierarchical scheduler.

13. The one or more machine-readable non-transitory storage media of claim 12, wherein the instructions further cause the NIC to issue one or more credits to at least one scheduler leaf node of the plurality of scheduler leaf nodes.

14. The one or more machine-readable non-transitory storage media of claim 13, wherein to issue the one or more credits to at least one scheduler leaf node of the tree-based hierarchical scheduler comprises to issue the one or more credits as a function of a rate limit associated with each scheduler leaf node.

15. The one or more machine-readable non-transitory storage media of claim 10, wherein to determine whether the identified node has a target amount of transmission credits available comprises to:
   identify a size of the network packet associated with the first transmit descriptor; and
   determine whether an amount of transmission credits presently assigned to the identified node is sufficient to transmit the network packet to the target computing device.

16. The one or more machine-readable non-transitory storage media of claim 15, wherein the instructions further cause the NIC to segment the network packet into a plurality of network packet segments and wherein to transmit the network packet associated with the first transmit descriptor to the target computing device comprises to transmit at least one segment of the plurality of network packet segments to the target computing device based on the amount of transmission credits presently assigned to the identified node.

17. A method comprising:
   retrieving, a window of transmit descriptors from a transmit descriptor queue, the transmit descriptor queue including transmit descriptors for multiple different streams;
   selecting, by a network interface controller (NIC), a first transmit descriptor from the window of transmit descriptors, wherein the first transmit descriptor is associated with a packet stream;
   identifying, by the NIC and in a plurality of nodes of a hierarchical scheduler, a node associated with the selected first transmit descriptor;
   determining, by the NIC, whether the identified node has a target amount of transmission credits available; and
   transmitting, by the NIC and in response to a determination that the identified node has a target amount of transmission credits available, a network packet associated with the first transmit descriptor to a target computing device, network packets in the stream are transmitted in order interleaved with network packets from other streams.

\* \* \* \* \*